(12) United States Patent
Wohlgemuth

(10) Patent No.: US 12,559,954 B2
(45) Date of Patent: Feb. 24, 2026

(54) PRESSURE HEAD

(71) Applicants: Progress Maschinen & Automation AG, Brixen (IT); METALLCONCEPT GmbH, Sarnthein (IT)

(72) Inventor: Kurt Wohlgemuth, Sarnthein (IT)

(73) Assignee: METALLCONCEPT GMBH, Sarnthein (IT)

( * ) Notice: Subject to any disclaimer, the term of this patent is extended or adjusted under 35 U.S.C. 154(b) by 508 days.

(21) Appl. No.: 17/831,952

(22) Filed: Jun. 3, 2022

(65) Prior Publication Data

US 2022/0298811 A1     Sep. 22, 2022

Related U.S. Application Data

(63) Continuation of application No. PCT/EP2020/084321, filed on Dec. 2, 2020.

(30) Foreign Application Priority Data

Dec. 5, 2019     (AT) ............................... A 51063/2019

(51) Int. Cl.
| | |
|---|---|
| *E04G 21/02* | (2006.01) |
| *B33Y 10/00* | (2015.01) |
| *B33Y 30/00* | (2015.01) |

(52) U.S. Cl.
CPC .............. *E04G 21/02* (2013.01); *B33Y 10/00* (2014.12); *B33Y 30/00* (2014.12)

(58) Field of Classification Search
None
See application file for complete search history.

(56) References Cited

U.S. PATENT DOCUMENTS

| | | | |
|---|---|---|---|
| 9,108,214 | B2 | 8/2015 | Riney et al. |
| 9,475,082 | B2 | 10/2016 | Riney et al. |
| 9,751,313 | B2 | 9/2017 | Obertegger |
| 9,994,029 | B2 | 6/2018 | Obertegger |
| 10,105,946 | B2 | 10/2018 | Nakamura et al. |
| 10,647,120 | B2 | 5/2020 | Stefani et al. |

(Continued)

FOREIGN PATENT DOCUMENTS

| | | |
|---|---|---|
| DE | 10 2014 008 183 | 12/2015 |
| DE | 10 2017 001 795 | 8/2018 |

(Continued)

OTHER PUBLICATIONS

WO202478919A1 with attached translation (Year: 2024).*
International Search Report issued Mar. 11, 2021 in International (PCT) Application No. PCT/EP2020/084321.

*Primary Examiner* — Emmanuel S Luk
(74) *Attorney, Agent, or Firm* — Wenderoth, Lind & Ponack, L.L.P.

(57)     ABSTRACT

A pressure head is provided for dispensing a water-binder mixture in a controlled manner, the mixture including water and at least one hydraulic binder, in particular a cementitious binder. The pressure head includes at least one supply channel for supplying the water-binder mixture, at least one outlet opening fluidically connected to the at least one supply channel, and at least one valve by which the at least one outlet opening can be opened and closed in a controlled manner. A specified dose of the water-binder mixture can be dispensed through the at least one outlet opening.

11 Claims, 6 Drawing Sheets

(56)                References Cited

U.S. PATENT DOCUMENTS

| | | | | |
|---|---|---|---|---|
| 10,967,571 | B1 * | 4/2021 | Elsasser | B29C 64/227 |
| 11,679,545 | B2 * | 6/2023 | Wohlgemuth | B33Y 30/00 |
| | | | | 264/308 |
| 12,042,988 | B2 * | 7/2024 | Bromberg | B29C 64/241 |
| 12,138,857 | B2 * | 11/2024 | Torabi | B29C 64/165 |
| 12,186,805 | B2 * | 1/2025 | Kasperchik | B22F 3/1021 |
| 2005/0015175 | A1 * | 1/2005 | Huang | B33Y 30/00 |
| | | | | 700/121 |
| 2007/0138678 | A1 * | 6/2007 | Khoshnevis | E04G 21/0463 |
| | | | | 52/561 |
| 2007/0138687 | A1 * | 6/2007 | Khoshnevis | B01F 35/7173 |
| | | | | 264/109 |
| 2007/0224358 | A1 | 9/2007 | Insausti-Eciolaza et al. | |
| 2008/0148683 | A1 | 6/2008 | Dini et al. | |
| 2014/0192117 | A1 | 7/2014 | Obertegger | |
| 2015/0115000 | A1 | 4/2015 | Riney et al. | |
| 2015/0306625 | A1 | 10/2015 | Riney et al. | |
| 2015/0314530 | A1 * | 11/2015 | Rogren | B33Y 10/00 |
| | | | | 264/131 |
| 2015/0360472 | A1 | 12/2015 | Obertegger | |
| 2016/0107386 | A1 * | 4/2016 | Hartmann | B29C 64/165 |
| | | | | 264/37.29 |
| 2016/0107387 | A1 * | 4/2016 | Ooba | B29C 64/165 |
| | | | | 425/130 |
| 2016/0236409 | A1 * | 8/2016 | Armani | B29C 64/106 |
| 2017/0251713 | A1 * | 9/2017 | Warner | A23P 30/20 |
| 2017/0297340 | A1 | 10/2017 | Obertegger | |
| 2018/0022105 | A1 | 1/2018 | Nakamura et al. | |
| 2019/0099945 | A1 * | 4/2019 | Hsing | C04B 28/02 |
| 2019/0168443 | A1 | 6/2019 | Wohlgemuth | |
| 2019/0283417 | A1 | 9/2019 | Stefani et al. | |
| 2020/0086552 | A1 * | 3/2020 | Yarka | B29C 64/321 |
| 2020/0114422 | A1 * | 4/2020 | Mark | B22F 1/10 |
| 2020/0130258 | A1 * | 4/2020 | Hengl | B28B 1/001 |
| 2020/0140332 | A1 * | 5/2020 | Colombo | C04B 28/34 |
| 2020/0147873 | A1 | 5/2020 | Lewis et al. | |
| 2020/0215750 | A1 * | 7/2020 | Long | B29C 64/209 |
| 2020/0324337 | A1 * | 10/2020 | Lieberwirth | B29C 48/53 |
| 2021/0016501 | A1 * | 1/2021 | Petros | B33Y 50/02 |
| 2021/0069789 | A1 * | 3/2021 | Moosberg | C04B 35/6263 |
| 2022/0009162 | A1 * | 1/2022 | Ballard | B29C 64/106 |
| 2022/0119658 | A1 * | 4/2022 | Harvey | B22F 10/14 |

FOREIGN PATENT DOCUMENTS

| | | | | |
|---|---|---|---|---|
| EP | 1 972 450 | | 9/2008 | |
| EP | 3 187 337 | | 7/2017 | |
| EP | 3 421 201 | | 1/2019 | |
| EP | 3 431 172 | | 1/2019 | |
| EP | 3431172 | A1 * | 1/2019 | B01F 15/00025 |
| JP | 6312758 | | 4/2018 | |
| WO | 2011/021080 | | 2/2011 | |
| WO | 2013/013983 | | 1/2013 | |
| WO | 2013/121143 | | 8/2013 | |
| WO | 2015/151831 | | 10/2015 | |
| WO | 2016/135545 | | 9/2016 | |
| WO | 2018/024836 | | 2/2018 | |
| WO | 2018/200518 | | 11/2018 | |
| WO | WO-2024078919 | A1 * | 4/2024 | E04G 21/0463 |

* cited by examiner

PRESSURE HEAD

BACKGROUND OF THE INVENTION

The invention relates to an arrangement with a water-binder mixture, comprising water and at least one hydraulic binder, in particular a cementitious binder, and at least one printhead for the controlled dispensing of the water-binder mixture, as well as the use of such an arrangement for the controlled dispensing of a water-binder mixture, comprising water and at least one hydraulic binder, in particular a cementitious binder, in a 3D printing device. The invention furthermore relates to a method for the controlled dispensing of a water-binder mixture, comprising water and at least one hydraulic binder, in particular a cementitious binder, by means of at least one such arrangement. And finally, the invention relates to a 3D printing device for the construction industry as well as a method for producing a 3D construction part for the construction industry by means of a 3D printing device.

The invention lies in the technical field of the 3D printing of 3D construction parts for the construction industry.

Concrete parts are usually manufactured with the aid of formwork elements. However, concrete parts which can be produced in this way are limited in terms of their shape. It would therefore be desirable to be able to produce concrete parts also with the aid of a 3D printing process.

However, a major difficulty is that hydraulic binders, such as e.g. cementitious binders, which react in the presence of water in a hydration reaction to form solid hydrates or hydrate phases, are used in the production of concrete parts. It has previously been assumed that these chemically proceeding processes prevent implementation in 3D printing devices since they very easily lead to blockages and thus irreparable damage.

SUMMARY OF THE INVENTION

The object of the present invention is to provide an arrangement with a water-binder mixture, comprising water and at least one hydraulic binder, in particular a cementitious binder, and at least one printhead for the controlled dispensing of the water-binder mixture, a method for the controlled dispensing of a water-binder mixture, comprising water and at least one hydraulic binder, in particular a cementitious binder, by means of at least one such arrangement as well as the use of such an arrangement for the controlled dispensing of a water-binder mixture, comprising water and at least one hydraulic binder, in particular a cementitious binder, in a 3D printing device, in which the difficulties known from the state of the art do not arise, or do so only in a greatly weakened form. A further object is to provide a 3D printing device for the construction industry as well as a method for producing a 3D construction part for the construction industry by means of a 3D printing device.

In the arrangement according to the invention, the at least one printhead comprises at least one supply duct for supplying the water-binder mixture, at least one outlet opening, which can be brought into fluid connection with the at least one supply duct, and at least one valve, with which the at least one outlet opening can be opened and closed in a controlled manner, as a result of which a predetermined dose of the water-binder mixture can be dispensed through the at least one outlet opening, wherein the at least one outlet opening has a diameter of between 0.5 and 2.0 mm, preferably wherein:

the at least one hydraulic binder is selected from a group consisting of Portland cement, calcium aluminate cement, calcium sulfoaluminate cement and mixtures thereof, and/or the water-binder mixture comprises at least one additive, preferably at least one superplasticizer.

It is thereby possible, contrary to the previous assumptions of the state of the art, to dispense a water-binder mixture by means of a printhead in a 3D printing device in a controlled manner and thus also to be able to produce concrete parts with the aid of a 3D printing process.

The printhead according to the invention can be operated in the manner of the inkjet process, wherein a predetermined dose of the water-binder mixture can be applied in a controlled manner.

The printhead is formed in such a way that blockages and thus destruction of the printhead should not occur during normal operation. For the case where a blockage nevertheless occurs, e.g. through incorrect use, according to an advantageous embodiment, the printhead has at least one base body, on which the at least one valve is arranged, and at least one exchangeable body that can be releasably connected to the at least one base body. The at least one outlet opening and/or the at least one supply duct are arranged on the at least one exchangeable body. It is thereby possible to separate the at least one valve from the parts of the printhead in which the water-binder mixture is conveyed. Should a local solidification occur, then it is simply and easily possible to replace the at least one exchangeable body and thus bring the printhead back into an operational state.

In this connection, the at least one exchangeable body consists of at least one, preferably acid-resistant, plastic, preferably selected from a group consisting of PE, PVC, POM, PTFE and mixtures thereof, and/or comprises at least one injection moulded part, and/or has at least two partial bodies that can preferably be releasably connected to one another, preferably wherein at least one seal is arranged between the at least two partial bodies.

Through these measures—alone or in combination with one another—it is possible to form the at least one exchangeable body in a cost-effective manner.

PTFE, which is also known by the name Teflon, is particularly appropriate as material since it prevents adhesion of constituents of the water-binder mixture and moreover is acid-resistant.

The acid resistance is advantageous because some cement solvents also contain acids for cleaning.

It has proved to be advantageous for the at least one valve:

to be formed as an electropneumatic or electromagnetic valve, and/or to have at least one compressed-air connection and/or at least one electrical connection, and/or to have at least one adjustable valve rod, preferably adjustable over an adjustment path of between 0.5 and 1.5 mm, preferably wherein the at least one valve rod consists of at least one hard metal at least in regions, and/or a free end of the at least one valve rod is formed in the shape of a spherical head, and/or a seal consisting of a flexible material, with which the at least one outlet opening can be sealed, is arranged on at least one free end of the at least one valve rod, and/or to comprise at least one return spring, preferably wherein the at least one return spring is formed in such a way that the at least one outlet opening can be closed with a closing force of between 10 and 50 N, particularly preferably with a closing force of between 20 and 40 N.

These measures—alone or in combination with one another—contribute to the fact that the at least one outlet opening can be reliably opened and closed by the at least one valve, without a blockage occurring due to a solidification reaction.

It has also proved to be favorable for at least one, preferably replaceable, sealing membrane to be provided, which seals at least one movable part of the at least one valve, preferably a valve rod, against a penetration of the water-binder mixture. In this way, damage to the at least one valve can be prevented very effectively.

Alternatively or in addition, the at least one outlet opening is formed in a nozzle body, preferably wherein the nozzle body is formed of at least one hard metal or ceramic, and/or has at least one sloping, preferably funnel-shaped, contact surface for a free end of a valve rod of the at least one valve. These measures—alone or in combination with one another—also contribute to the fact that the at least one outlet opening can be reliably opened and closed by means of the at least one valve, without a blockage occurring due to a solidification reaction.

According to an advantageous embodiment, the at least one supply duct has at least one intake opening for the water-binder mixture, preferably wherein the at least one supply duct has at least one output opening lying opposite the at least one intake opening, particularly preferably wherein the at least one intake opening and/or the at least one output opening has a thread for connecting a fluid line. If the at least one supply duct has both at least one intake opening for the water-binder mixture and at least one output opening, then the at least one supply duct can be integrated in a circulation circuit for the water-binder mixture, from which a predetermined dose of the water-binder mixture is then removed in a controlled manner via the at least one output opening.

It is appropriate for the printhead to have at least one venting duct, with which a pressure equalization can be generated for at least one movable part of the at least one valve, preferably a valve rod. In this way, a negative pressure forming through the movement of the at least one movable part of the at least one valve can be efficiently prevented. Such a negative pressure would create the danger of some of the water-binder mixture penetrating into the at least one valve.

It has proved to be favorable for at least one control and/or regulation device to be provided with which the at least one valve can be controlled, and/or for the printhead to comprise a plurality of outlet openings, wherein the outlet openings are arranged, preferably equidistantly, on at least one line.

Furthermore, protection is sought for a method for the controlled dispensing of a water-binder mixture, comprising water and at least one hydraulic binder, in particular a cementitious binder, by means of at least one arrangement according to the invention.

The method comprises the following method steps: the water-binder mixture is supplied to the at least one outlet opening of the at least one printhead via the at least one supply duct of the at least one printhead, preferably with a pressure of between 0.1 and 2.0 bar, and the at least one outlet opening is opened and closed in a controlled manner by means of the at least one valve of the at least one printhead and a predetermined dose of the water-binder mixture is thereby dispensed through the at least one outlet opening.

Furthermore, protection is sought for a 3D printing device for the construction industry comprising at least one layer depositing device for the layered depositing of at least one particulate aggregate on a printing platform and at least one arrangement with a water-binder mixture, comprising water and at least one hydraulic binder, in particular a cementitious binder, and at least one printhead according to the invention for the controlled dispensing of a water-binder mixture, comprising water and at least one hydraulic binder, in particular a cementitious binder, on at least one locally predetermined region of a layer of the at least one aggregate deposited on the printing platform by the at least one layer depositing device, preferably wherein the 3D printing device has at least one carrier which is adjustable, in the operating position of the 3D printing device, in the vertical direction, and on which the at least one layer depositing device and/or the at least one printhead are mounted adjustable in the horizontal direction. At the least, all materials which are used at the time of the application in the production of concrete parts, such as e.g. sand, gravel, grit, come into consideration as particulate aggregates—also called crushed stone.

Furthermore, protection is sought for a use of an arrangement according to the invention for the controlled dispensing of a water-binder mixture, comprising water and at least one hydraulic binder, in particular a cementitious binder, in a 3D printing device for the construction industry.

And finally, protection is sought for a method for producing a 3D construction part for the construction industry by means of a 3D printing device, wherein the method comprises the following method steps: at least one layer of the at least one particulate aggregate is deposited on a printing platform by means of the at least one layer depositing device, and a predetermined dose of the water-binder mixture is dispensed on at least one locally predetermined region of the at least one layer of the at least one aggregate by means of the at least one printhead.

According to a preferred design of the method, a predetermined dose of the water-binder mixture is dispensed on at least one locally predetermined region of the printing platform before a first layer of the at least one aggregate is deposited on the printing platform, and/or a predetermined dose of the water-binder mixture is dispensed on at least one locally predetermined region of the last layer of the at least one aggregate after a last layer of the at least one aggregate is deposited. Through these method steps it is possible to achieve 3D construction parts with particularly smooth surfaces, which do not differ from the smoothness of surfaces that can be produced by means of formwork elements, or only differ insignificantly.

BRIEF DESCRIPTION OF THE DRAWINGS

Further details and advantages of the invention are explained in more detail below by the description of the invention with reference to the drawings in which:

FIG. 6 shows a schematically represented embodiment of a valve of a printhead for the controlled dispensing of a water-binder mixture in a perspective view, FIGS. 7a, 7b show an isolated representation of a valve rod of the valve represented in FIG. 6 and of a nozzle body, wherein the valve rod and the nozzle body are in contact with one another in sub-figure a) and the valve rod and the nozzle body are spaced apart from one another in sub-figure b), FIG. 8 shows an isolated representation of a valve rod of the valve represented in FIG. 6, FIG. 9 shows an isolated representation of a nozzle body of the valve represented in FIG. 6, and FIG. 10 shows a schematically represented embodiment of a 3D construction part, produced according to a method for producing a 3D construction part for the construction industry by means of a 3D printing device for the construction industry, in a perspective view.

DETAILED DESCRIPTION OF THE INVENTION

Figure 1:
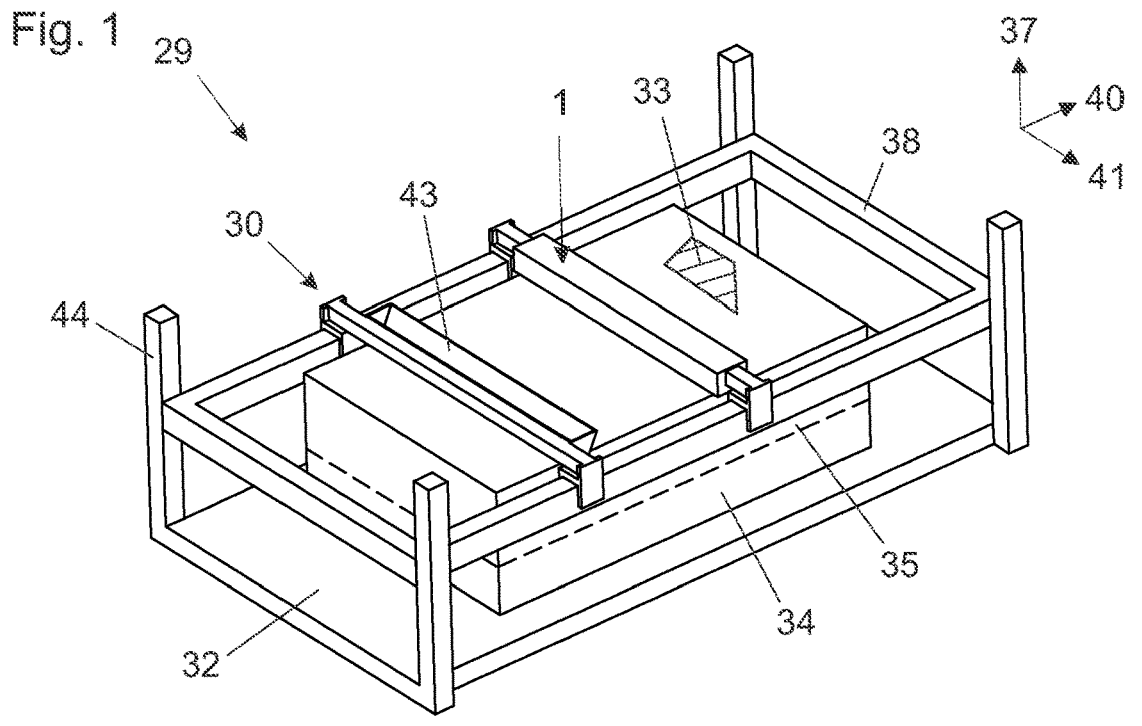
FIG. 1 shows a schematically represented embodiment of a 3D printing device for the construction industry in a perspective view.

FIG. 1 shows a schematically represented embodiment of a 3D printing device 29 for the construction industry comprising a layer depositing device 30 for the layered depositing of at least one particulate aggregate 31 on a printing platform 32 and a printhead 1 for the controlled dispensing of a water-binder mixture 2, comprising water and at least one hydraulic binder, in particular a cementitious binder, on at least one locally predetermined region 33 of a layer 34, 35 of the at least one aggregate 31 deposited on the printing platform 32 by the layer depositing device 30. The printhead 1 can be formed according to the embodiment described in more detail below.

The 3D printing device 29 has at least one carrier 38 which is adjustable, in the operating position of the 3D printing device 29, in the vertical direction 37, and on which the layer depositing device 30 and the printhead 1 are mounted adjustable in the horizontal direction 40, 41.

More than one layer depositing device 30 and/or more than one printhead 1 can also be provided. The printing speed can thereby be increased.

As in the case represented, the layer depositing device 30 can have a dispensing trough 43 as temporary storage for the at least one particulate aggregate 31.

The carrier 38, which can be formed as a closed frame as in the case represented, can be mounted adjustable on columns 44 for the adjustment in the vertical direction 37.

Figure 2:
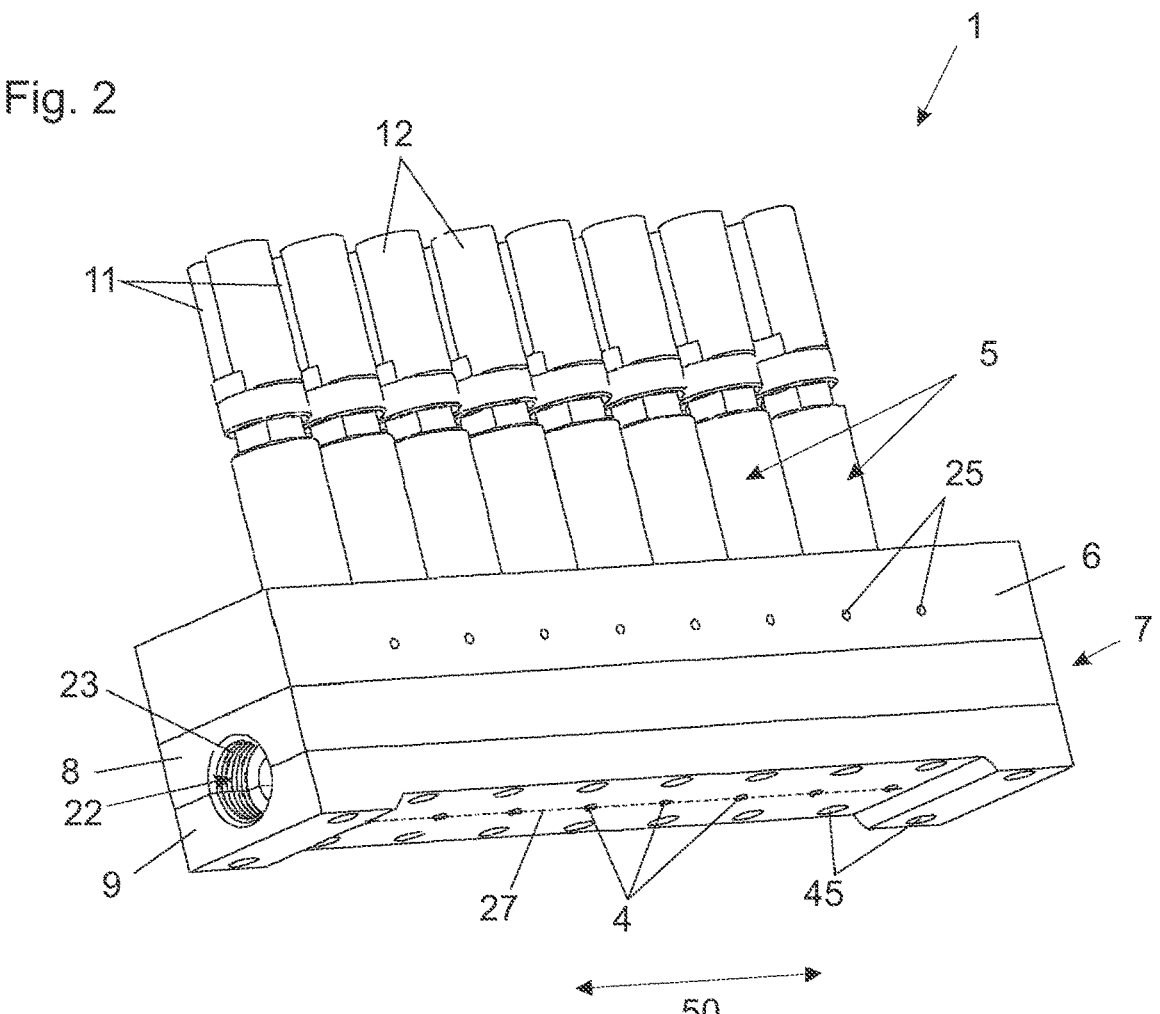
FIG. 2 shows a schematically represented embodiment of a printhead for the controlled dispensing of a water-binder mixture in a perspective view.

FIG. 2 and the following figures show a schematically represented embodiment of a printhead 1 for the controlled dispensing of a water-binder mixture, comprising water and at least one hydraulic binder, in particular a cementitious binder. The printhead 1 comprises a supply duct 3 for supplying the water-binder mixture 2, several outlet openings 4, which can be brought into fluid connection with the supply duct 3, and several valves 5, with which the outlet openings 4 can be opened and closed in a controlled manner, as a result of which a predetermined dose 49 of the water-binder mixture 2 can be dispensed through the outlet openings 4.

The outlet openings 4 are arranged equidistantly on a line 27.

The valves 5 are formed as electropneumatic valves and each have a compressed-air connection 11 and an electrical connection 12. Via the compressed-air connection 11, the valve 5 can be supplied with compressed air, with which a cylinder 47, which is connected to a valve rod 14 in a movement-coupled manner, is subsequently actuatable (see also FIG. 5b).

Figures 6, 7A, 7B, 8, 9:
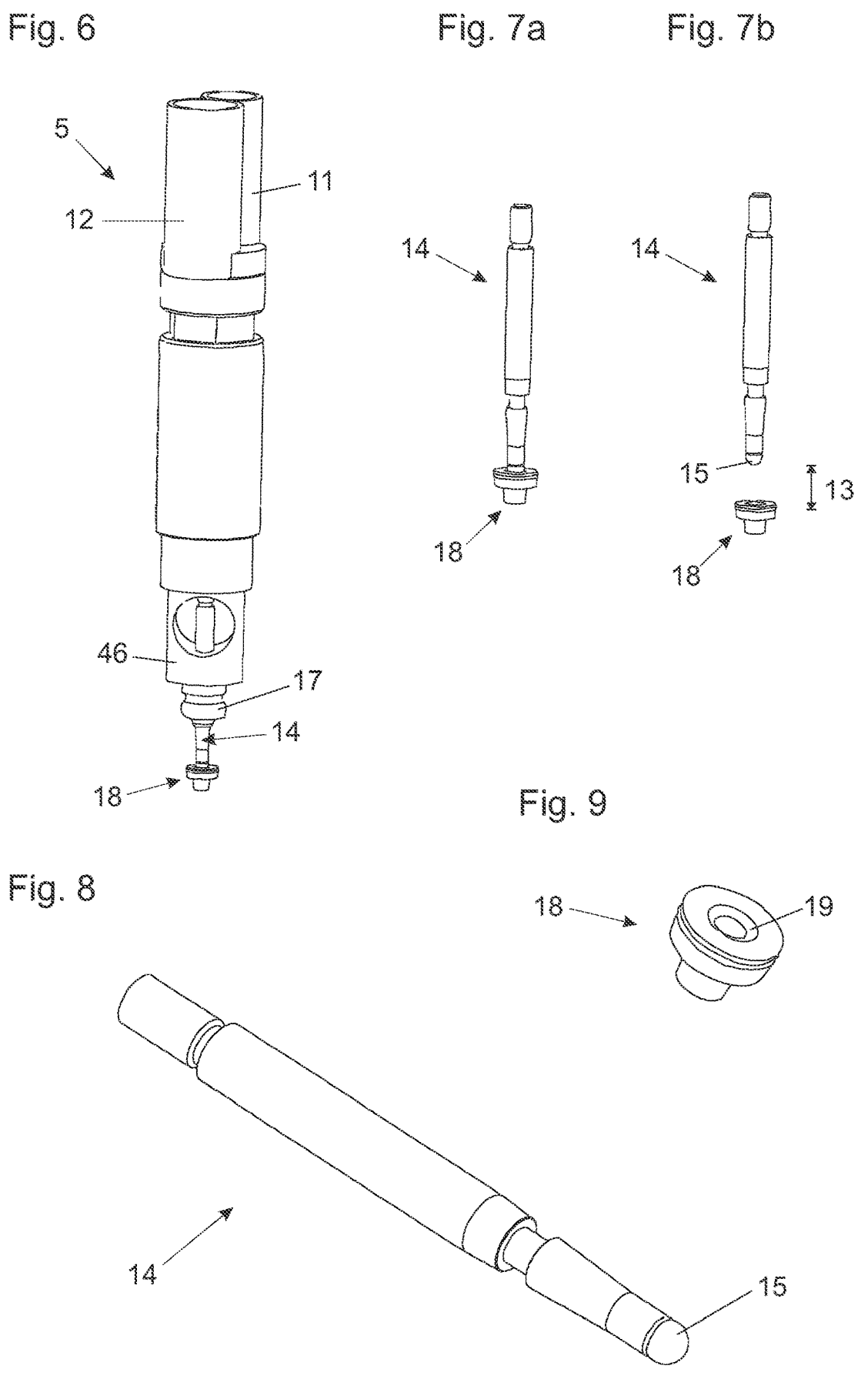

The valves 5 each have one adjustable valve rod 14, preferably adjustable over an adjustment path 13 of between 0.5 and 1.5 mm, preferably made of at least one hard metal. The adjustment path 13 is represented in FIG. 7b.

As in the case represented, the valve rods 14 can have a free end 15, which is formed in the shape of a spherical head.

The valves 5 can comprise at least one return spring 16, preferably wherein the at least one return spring 16 is formed in such a way that the assigned outlet opening 4 can be closed with a closing force of between 10 and 50 N, particularly preferably with a closing force of between 20 and 40 N. Such a return spring is represented schematically in FIG. 5b.

The valves 5 can have a bearing 46 for the valve rod 14, wherein the bearing 46 can be formed sleeve-like, as in the case represented. The bearing 46 surrounds the valve rod 14 and the valve rod 14 moves relative to the bearing 46.

One, preferably replaceable, sealing membrane 17, which seals the valve rod 14 against a penetration of the water-binder mixture 2, is provided for each valve 5. In the specific case, the sealing membrane is arranged in a sealing manner between the valve rod 14 and the bearing 46.

Figures 5A, 5B:
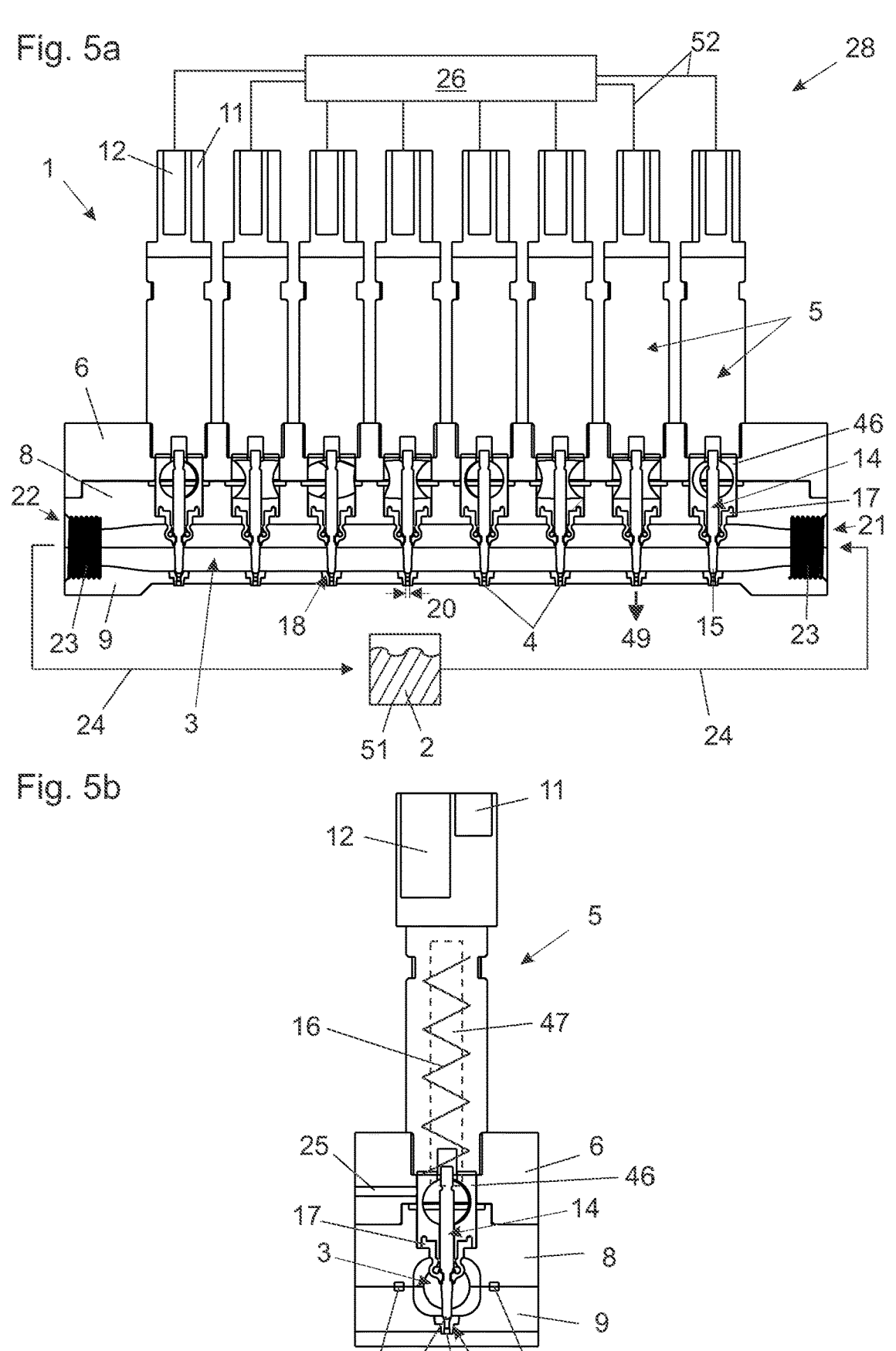
FIG. 5a shows a schematically represented embodiment of an arrangement with a water-binder mixture, comprising water and at least one hydraulic binder, in particular a cementitious binder, and a printhead for the controlled dispensing of the water-binder mixture in a cross-sectional view along a cross-sectional plane parallel to a longitudinal axis of the printhead.
FIG. 5b shows the embodiment of the printhead represented in FIG. 2 in a cross-sectional view along a cross-sectional plane perpendicular to a longitudinal axis of the printhead.

The printhead 1 has several venting ducts 25, with which a pressure equalization can be generated for the valve rods 14 (see also FIG. 5b). Without the venting ducts 25, there is the danger that a negative pressure, through which some of the water-binder mixture 2 is drawn in and thereby penetrates into the valve 5, will form on the side of the sealing membrane 17 facing the valve 5.

Figure 3A:
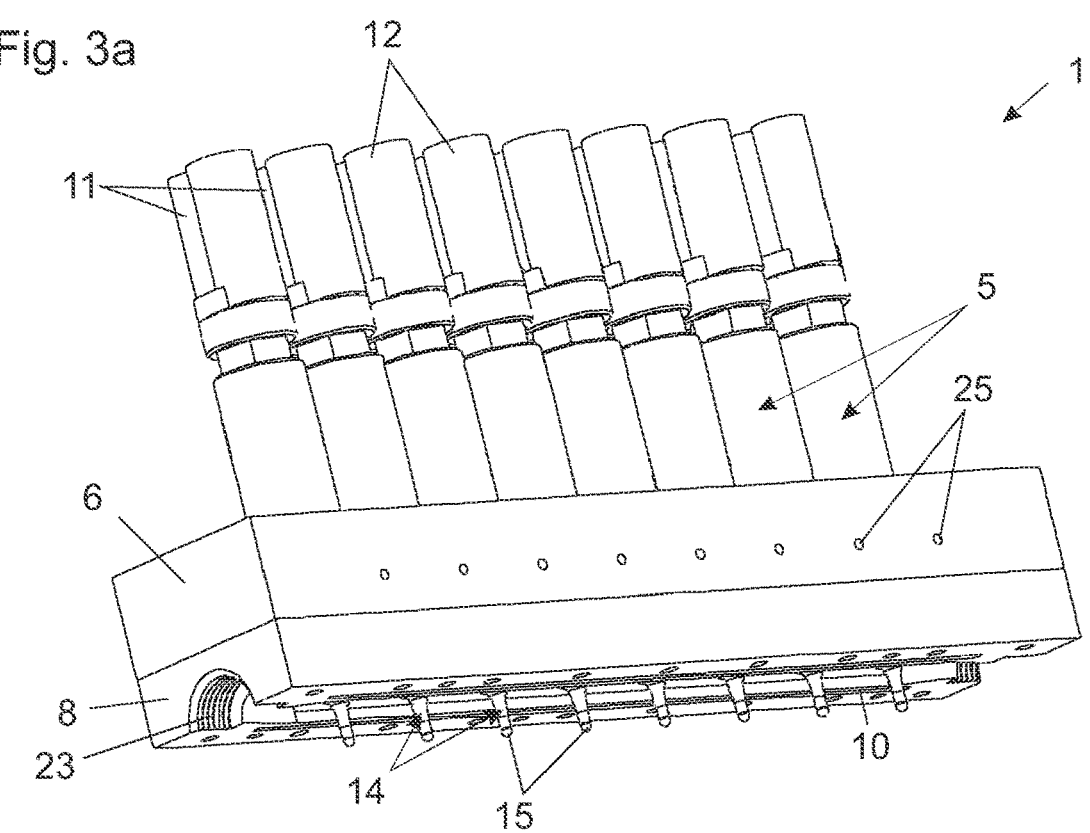
FIG. 3a shows the embodiment of the printhead represented in FIG. 2, wherein a first partial body of an exchangeable body has been left out.
Figure 3B:
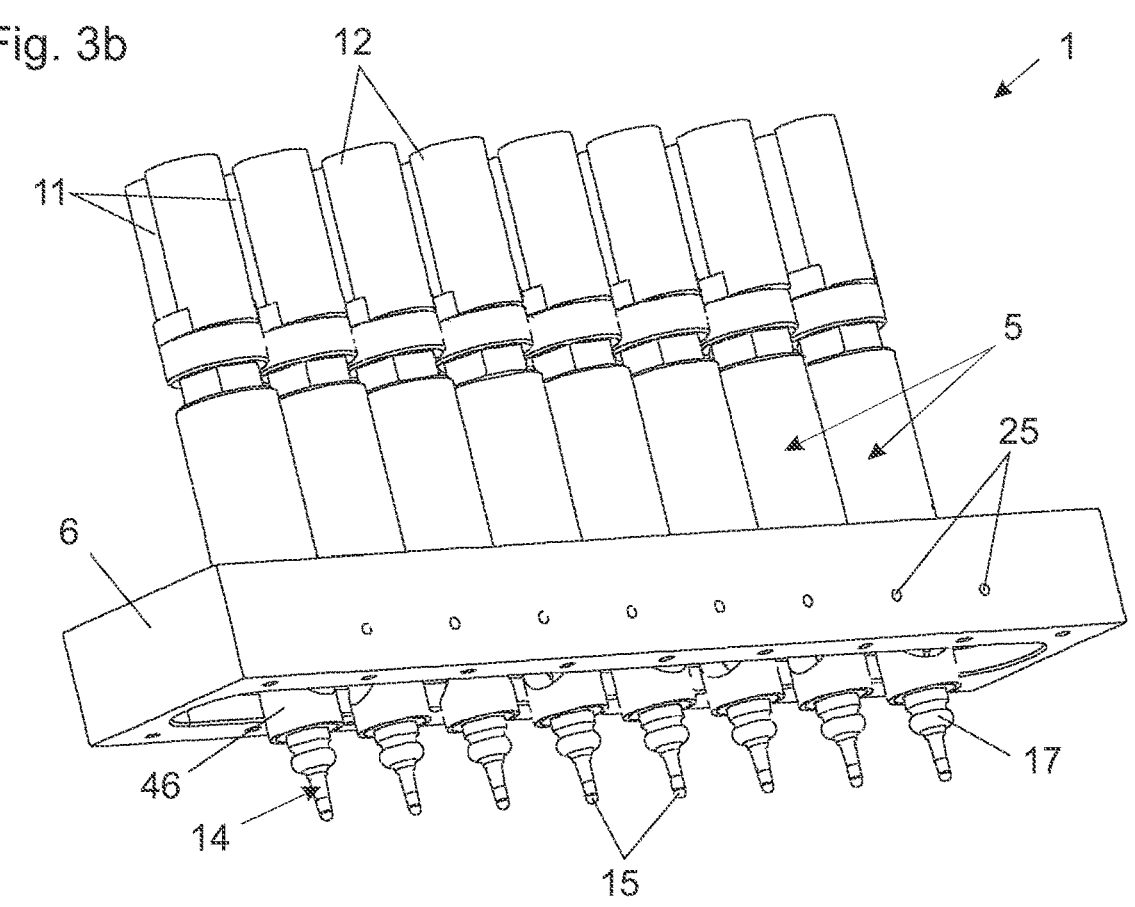
FIG. 3b shows the embodiment of the printhead represented in FIG. 2, wherein a first and a second partial body of an exchangeable body have been left out.
Figure 4A:
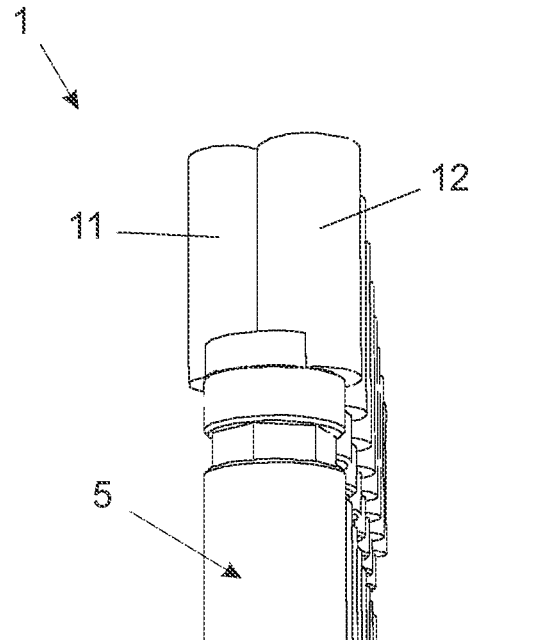
FIG. 4a shows the embodiment of the printhead represented in FIG. 2 in a perspective side view.
Figure 4A:
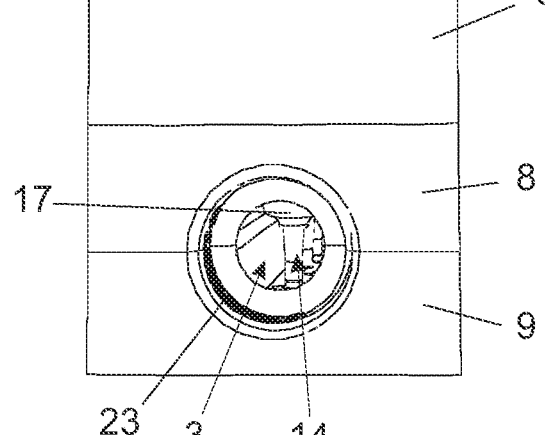
Figure 4B:
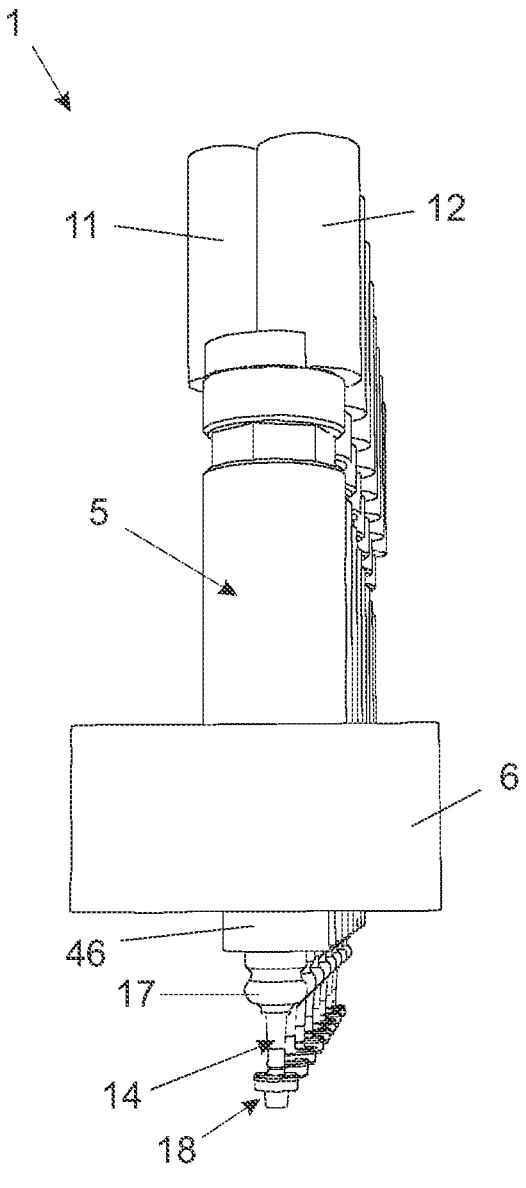
FIG. 4b shows the embodiment of the printhead represented in FIG. 4a), wherein a first and a second partial body of an exchangeable body have been left out.

FIGS. 3a and 3b show particularly well that the printhead 1 has a base body 6, on which the valves 5 are arranged, and an exchangeable body 7 (see also FIG. 2) that can be releasably connected to the base body 6. The outlet openings 4 and the supply duct 3 are arranged on the exchangeable body 7. For releasably connecting the exchangeable body 7 to the base body 6, fasteners 45 can be provided (see FIG. 2) which, as in the case represented, can be formed as screws which engage in threads which are formed in the base body 6.

The exchangeable body 7 consists of at least one acid-resistant plastic, preferably selected from a group consisting of PE, PVC, POM, PTFE and mixtures thereof, and comprises at least one injection moulded part.

The exchangeable body 7 has two partial bodies 8, 9 that can be releasably connected to one another, preferably wherein a seal 10 is arranged between the two partial bodies 8, 9 (see FIGS. 3a and 5b).

FIG. 5a shows a schematically represented embodiment of an arrangement 28 with a water-binder mixture 2, comprising water and at least one hydraulic binder, in particular a cementitious binder, and a printhead 1 for the controlled dispensing of the water-binder mixture in a cross-sectional view along a cross-sectional plane parallel to a longitudinal axis 50 of the printhead 1. The longitudinal axis 50 is shown as an arrow in FIG. 2.

The printhead 1 is formed according to the previously described preferred embodiment.

The at least one hydraulic binder is selected from a group consisting of Portland cement, calcium aluminate cement, calcium sulfoaluminate cement and mixtures thereof.

The water-binder mixture 2 comprises an additive in the form of a superplasticizer.

The supply duct 3 has an intake opening 21 for the water-binder mixture 2, wherein the supply duct 3 has an output opening 22 lying opposite the intake opening 21. The intake opening 21 and the output opening 22 each have a thread 23 for connecting a fluid line 24.

The water-binder mixture 2 can be arranged in a tank 51. The fluid lines 24 connect the tank 51 to the supply duct 3 of the printhead 1.

A control and/or regulation device 26 is provided, with which the valves 5 of the printhead 1 can be controlled. The control and/or regulation device 26 is connected to the electrical connection 12 of the valves 5 in each case via lines 52.

The arrangement 28 can carry out a method for the controlled dispensing of a water-binder mixture 2, comprising water and at least one hydraulic binder, in particular a cementitious binder. The method comprises the following method steps: the water-binder mixture 2 is supplied to the outlet openings 4 of printhead 1 via the supply duct 3 of the printhead 1, preferably with a pressure of between 0.1 and 2.0 bar, and the outlet openings 4 are opened and closed in a controlled manner by means of the valves 5 of the printhead 1 and a predetermined dose 49 of the water-binder mixture 2 is thereby dispensed through the outlet openings 4.

FIGS. 6, 7a, 7b, 8 and 9 show details of an embodiment of a valve 5 of the printhead 1 for the controlled dispensing of a water-binder mixture 2 as well as a nozzle body 18 which cooperates with the valve rod 14 of the valve 5 and in which the outlet opening 4 is formed. The diameter 20 (see FIG. 5a) of the outlet opening 4 is between 0.5 and 2.0 mm.

The nozzle body 18 is formed of at least one hard metal or ceramic and has a sloping contact surface 19 for a free end 15 of the valve rod 14 of the valve 5. The sloping contact surface 19 can be formed funnel-shaped, as in the case represented.

Figure 10:
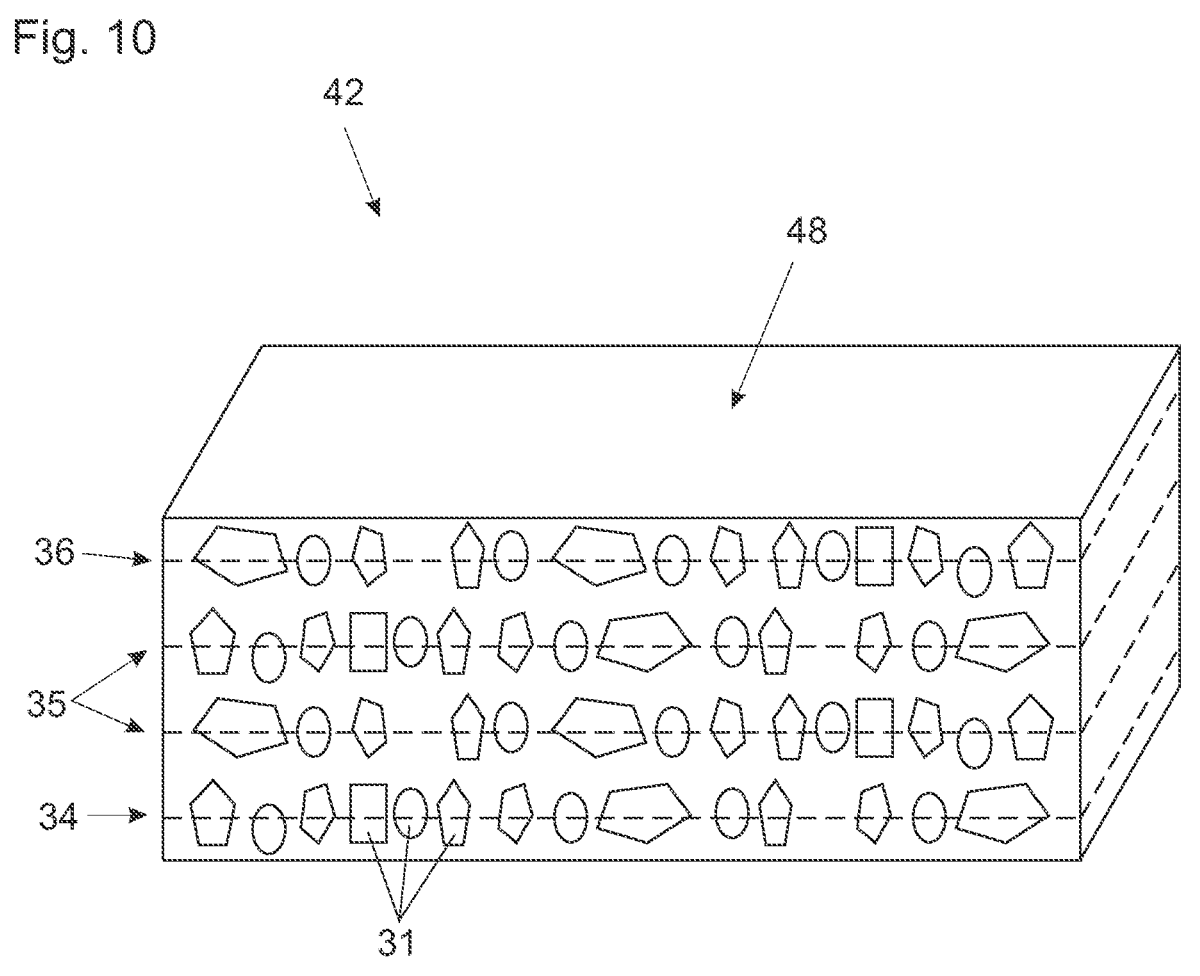

FIG. 10 shows a schematically represented embodiment of a 3D construction part 42, produced according to a method for producing a 3D construction part 42 for the construction industry by a 3D printing device 29 for the construction industry, wherein the method comprises the following method steps: layers 34, 35, 36 of the at least one particulate aggregate 31 are deposited on a printing platform 32 by the layer depositing device 30 (the layers 34, 35, 36 are indicated by dashed lines in FIGS. 1 and 10), and a predetermined dose 49 of the water-binder mixture 2 is dispensed on locally predetermined regions 33 of the layers 34, 35, 36 of the at least one aggregate 31 by the printhead 1.

In the case of the 3D construction part 42 represented, a predetermined dose 49 of the water-binder mixture 2 was dispensed on at least one locally predetermined region 33 of the printing platform 32 before a first layer 34 of the at least one aggregate 31 was deposited on the printing platform 32, and a predetermined dose 49 of the water-binder mixture 2 was dispensed on at least one locally predetermined region 33 of the last layer 36 of the at least one aggregate 31 after a last layer 36 of the at least one aggregate 31 was deposited. In this way, very smooth surfaces 48 can be generated on the top and bottom of the 3D construction part 42.

The invention claimed is:

1. A 3D printing device comprising:
   a layer depositing device configured to deposit a layer of a particulate aggregate on a printing platform; and
   an arrangement containing a water-binder mixture comprising water and a hydraulic cementitious binder, the arrangement including a printhead configured to perform controlled dispensing of the water-binder mixture on a locally predetermined region of the layer of the particulate aggregate deposited on the printing platform by the layer depositing device,
   wherein the printhead includes:
      a supply duct configured to receive a supply of the water-binder mixture;
      an outlet opening in fluid communication with the supply duct; and
      a valve configured to open and close the outlet opening in a controlled manner so as to dispense a predetermined dose of the water-binder mixture through the outlet opening, the outlet opening having a diameter in a range of between 0.5 mm and 2.0 mm.

2. The 3D printing device according to claim 1, wherein the printhead further includes:
   a base body having the valve arranged thereon, and
   an exchangeable body to be releasably connected to the base body, wherein the outlet opening and/or the supply duct are arranged in the exchangeable body.

3. The 3D printing device according to claim 2, wherein the exchangeable body comprises:
   a plastic selected from a group consisting of PE, PVC, POM, PTFE and mixtures thereof; and/or
   an injection moulded part; and/or
   at least two partial bodies to be releasably connected to one another, a seal being arranged between the at least two partial bodies.

4. The 3D printing device according to claim 1, wherein the valve:
   is an electropneumatic or electromagnetic valve; and/or
   has a compressed-air connection and/or at least one electrical connection; and/or
   has a valve rod adjustable over an adjustment path in a range of between 0.5 mm and 1.5 mm, the valve rod having a free end formed as a spherical head and a seal formed of a flexible material to seal the outlet opening; and/or
   comprises a return spring configured to close the outlet opening with a closing force of between 10 N and 50 N.

5. The 3D printing device according to claim 1, further comprising a sealing membrane configured to seal a valve rod of the valve against penetration of the water-binder mixture.

6. The 3D printing device according to claim 1, wherein the outlet opening:
   is within a nozzle body formed of a metal or a ceramic, and/or
   has a sloping, funnel-shaped, contact surface for receiving a free end of a valve rod of the valve.

7. The 3D printing device according to claim 1, wherein the supply duct has an intake opening for receiving the water-binder mixture, and has an output opening opposite the intake opening, at least one of the intake opening and the output opening having a thread for allowing connection of the supply duct to a fluid line.

8. The 3D printing device according to claim 1, wherein the printhead further includes a venting duct to generate a pressure equalization for a valve rod of the valve.

9. The 3D printing device according to claim 1, wherein:
the 3D printing device further comprises a controller configured to control the valve, and/or
the printhead further includes a plurality of outlet openings arranged equidistantly along a straight line.

10. The 3D printing device according to claim 1, wherein the layer depositing device is configured to deposit only the layer of particulate aggregate on the printing platform without the water-binder mixture.

11. The 3D printing device according to claim 1, wherein the layer depositing device is separate from the printhead of the arrangement, and is configured to deposit the layer of particulate aggregate on the printing platform before the printhead dispenses the water-binder mixture on the locally predetermined region of the layer of the particulate aggregate.

\* \* \* \* \*